(12) United States Patent
Garrett et al.

(10) Patent No.: US 9,058,370 B2
(45) Date of Patent: Jun. 16, 2015

(54) METHOD, SYSTEM AND PROGRAM PRODUCT FOR DEFINING IMPORTS INTO AND EXPORTS OUT FROM A DATABASE SYSTEM USING SPREAD SHEETS BY USE OF A CONTROL LANGUAGE

(75) Inventors: Andrew J. Garrett, Herts (GB); Scott D. Hicks, Underhill Center, VT (US); Douglas G. Murray, Johnson City, NY (US); Jeffrey E. Prince, Bloomfield Hills, MI (US)

(73) Assignee: International Business Machines Corporation, Armonk, NY (US)

( * ) Notice: Subject to any disclaimer, the term of this patent is extended or adjusted under 35 U.S.C. 154(b) by 1967 days.

(21) Appl. No.: 11/679,597

(22) Filed: Feb. 27, 2007

(65) Prior Publication Data

US 2008/0209444 A1 Aug. 28, 2008

(51) Int. Cl.
| | | |
|---|---|---|
| *G06F 17/00* | (2006.01) | |
| *G06F 17/30* | (2006.01) | |
| *G06F 17/24* | (2006.01) | |

(52) U.S. Cl.
CPC ........ *G06F 17/30569* (2013.01); *G06F 17/246* (2013.01)

(58) Field of Classification Search
CPC .............................. G06F 17/246; G06F 17/30
USPC .................. 715/200, 212, 217, 219, 249, 272
See application file for complete search history.

(56) References Cited

U.S. PATENT DOCUMENTS

| | | | | |
|---|---|---|---|---|
| 5,293,615 | A | * | 3/1994 | Amada .............................. 707/4 |
| 5,920,873 | A | * | 7/1999 | Van Huben et al. .......... 707/202 |
| 6,088,693 | A | * | 7/2000 | Van Huben et al. .............. 707/8 |
| 6,094,654 | A | * | 7/2000 | Van Huben et al. .............. 707/8 |
| 6,631,497 | B1 | * | 10/2003 | Jamshidi et al. .............. 715/205 |
| 6,791,585 | B1 | | 9/2004 | Brecher et al. |
| 6,948,134 | B2 | | 9/2005 | Gauthier et al. |
| 6,988,242 | B2 | * | 1/2006 | Geuss et al. .................. 715/212 |
| 2002/0013786 | A1 | | 1/2002 | Machalek |
| 2004/0088650 | A1 | | 5/2004 | Killen et al. |
| 2004/0205521 | A1 | * | 10/2004 | Geuss et al. .................. 715/503 |
| 2005/0022111 | A1 | | 1/2005 | Collet et al. |
| 2005/0039114 | A1 | | 2/2005 | Naimat et al. |
| 2005/0198567 | A1 | | 9/2005 | Vermeulen et al. |
| 2006/0010367 | A1 | | 1/2006 | Sattler et al. |
| 2006/0015525 | A1 | * | 1/2006 | Geuss et al. .................. 707/102 |
| 2006/0224946 | A1 | * | 10/2006 | Barrett et al. ................. 715/503 |

\* cited by examiner

*Primary Examiner* — Stephen Hong
*Assistant Examiner* — Gregory J Vaughn
(74) *Attorney, Agent, or Firm* — Lisa Ulrich; Hoffman Warnick LLC

(57) ABSTRACT

The present invention provides a vehicle for the exchange of data between a database and an independent spreadsheet. Specifically, the present invention may be used to import data from a database to a spreadsheet and/or to export data to a spreadsheet. To facilitate this exchange, one or more controls are entered into cells in the spreadsheet. The controls specify the manner in which the data is exchanged between the database and the spreadsheet. For example, a control may specify a data type, a formatting parameter, a source field, a destination field, and/or a formula for a designated cell in the spreadsheet. The controls are executed by a linker that links the data in the database and the data in the spreadsheet to effect the exchange of data between the two.

20 Claims, 3 Drawing Sheets

FIG. 2

METHOD, SYSTEM AND PROGRAM PRODUCT FOR DEFINING IMPORTS INTO AND EXPORTS OUT FROM A DATABASE SYSTEM USING SPREAD SHEETS BY USE OF A CONTROL LANGUAGE

FIELD OF THE INVENTION

The present invention generally relates to data exchange. Specifically, the present invention provides tools for the exchange of data between a database and a spreadsheet that is independent from the database.

BACKGROUND OF THE INVENTION

In the world of information technology the there are many ways for storing and displaying data. The most ubiquitous method of data storage is the database. Databases are uniquely adapted to store and retrieve large amounts of data, owing to the search and indexing tools, among others, found therein. However, databases are often limited in the manner in which they can display data.

Spreadsheets, in contrast, are uniquely adapted to display data, especially tabular data, in a manner that is logical and aesthetically pleasing. Because of this, some databases contain spreadsheet-like elements for data display. However, these elements are, by nature limited in functionality. In contrast, other databases may be included in software packages that are developed by a particular software manufacturer. However, users of these packages are limited to a single database/spreadsheet combination. Furthermore, the retrieval of the desired data is not automated from the spreadsheet side of the equation. As such, in order to display a particular dataset in spreadsheet format, the user must be familiar with the associated database in order to indicate the desired data and export the data to the spreadsheet. Still further, current applications do not provide the wherewithal for allowing a user to update the data in the spreadsheet and to have those updates reflected in the database.

In view of the foregoing, there exists a need for a solution that overcomes the shortcomings of the prior art.

SUMMARY OF THE INVENTION

In general, the present invention provides a vehicle for the exchange of data between a database and an independent spreadsheet. Specifically, the present invention may be used to import data from a database to a spreadsheet and/or to export data to a spreadsheet. To facilitate this exchange, one or more controls are entered into cells in the spreadsheet. The controls specify the manner in which the data is exchanged between the database and the spreadsheet. For example, a control may specify a data type, a formatting parameter, a source field, a destination field, and/or a formula for a designated cell in the spreadsheet. The controls are executed by a linker that links the data in the database and the data in the spreadsheet to effect the exchange of data between the two.

A first aspect of the present invention provides a method for exchanging data between a database and a spreadsheet that is independent from the database, comprising: obtaining a database, the database having data; obtaining a spreadsheet, the spreadsheet having a plurality of cells for storing data; including, in at least one of the cells the spreadsheet, a control that controls a manner of an exchange of the data between the database and the spreadsheet; and executing the control using a linker that facilitates the exchange of the data between the database and the spreadsheet.

A second aspect of the present invention provides a system for exchanging data between a database and a spreadsheet that is independent from the database, comprising: a database having data; a spreadsheet having a plurality of cells for storing data, at least one of the cells the spreadsheet having a control that controls a manner of an exchange of the data between the database and the spreadsheet; a linker that executes the control to facilitates the exchange of the data between the database and the spreadsheet.

A third aspect of the present invention provides a program product stored on a computer readable medium for exchanging data between a database and a spreadsheet that is independent from the database browser, the computer readable medium comprising: program code for a database, the database having data; program code for obtaining a spreadsheet, the spreadsheet having a plurality of cells for storing data; program code for including, in at least one of the cells the spreadsheet, a control that controls a manner of an exchange of the data between the database and the spreadsheet; and program code for executing the control using a linker that facilitates the exchange of the data between the database and the spreadsheet.

A fourth aspect of the present invention provides a method for exchanging data between a database and a spreadsheet that is independent from the database browser, comprising: obtaining a database, the database having data; obtaining a spreadsheet, the spreadsheet having a plurality of cells for storing data; including, in at least one of the cells the spreadsheet, a control that controls a manner of an exchange of the data between the database and the spreadsheet; and executing the control using a linker that facilitates the exchange of the data between the database and the spreadsheet.

A fifth aspect of the present invention provides computer software embodied in a propagated signal for exchanging data between a database and a spreadsheet that is independent from the database browser, the computer software comprising instructions for causing a computer system to perform the following: obtain a database, the database having data; obtain a spreadsheet, the spreadsheet having a plurality of cells for storing data; include, in at least one of the cells the spreadsheet, a control that controls a manner of an exchange of the data between the database and the spreadsheet; and execute the control using a linker that facilitates the exchange of the data between the database and the spreadsheet.

A sixth aspect of the present invention provides a method for exchanging data between a database and a spreadsheet that is independent from the database browser, the method comprising managing a computer infrastructure that performs the process described herein; and receiving payment based on the managing.

Therefore, the present invention provides a method, system, and program product for exchanging data between a database and a spreadsheet that is independent from the database browser.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which:

FIG. 2 shows a spreadsheet with imbedded controls according to one embodiment of the present invention.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, the present invention provides a vehicle for the exchange of data between a database and an independent spreadsheet. Specifically, the present invention may be used to import data from a database to a spreadsheet and/or to export data to a spreadsheet. To facilitate this exchange, one or more controls are entered into cells in the spreadsheet. The controls specify the manner in which the data is exchanged between the database and the spreadsheet. For example, a control may specify a data type, a formatting parameter, a source field, a destination field, and/or a formula for a designated cell in the spreadsheet. The controls are executed by a linker that links the data in the database and the data in the spreadsheet to effect the exchange of data between the two.

Figure 1:
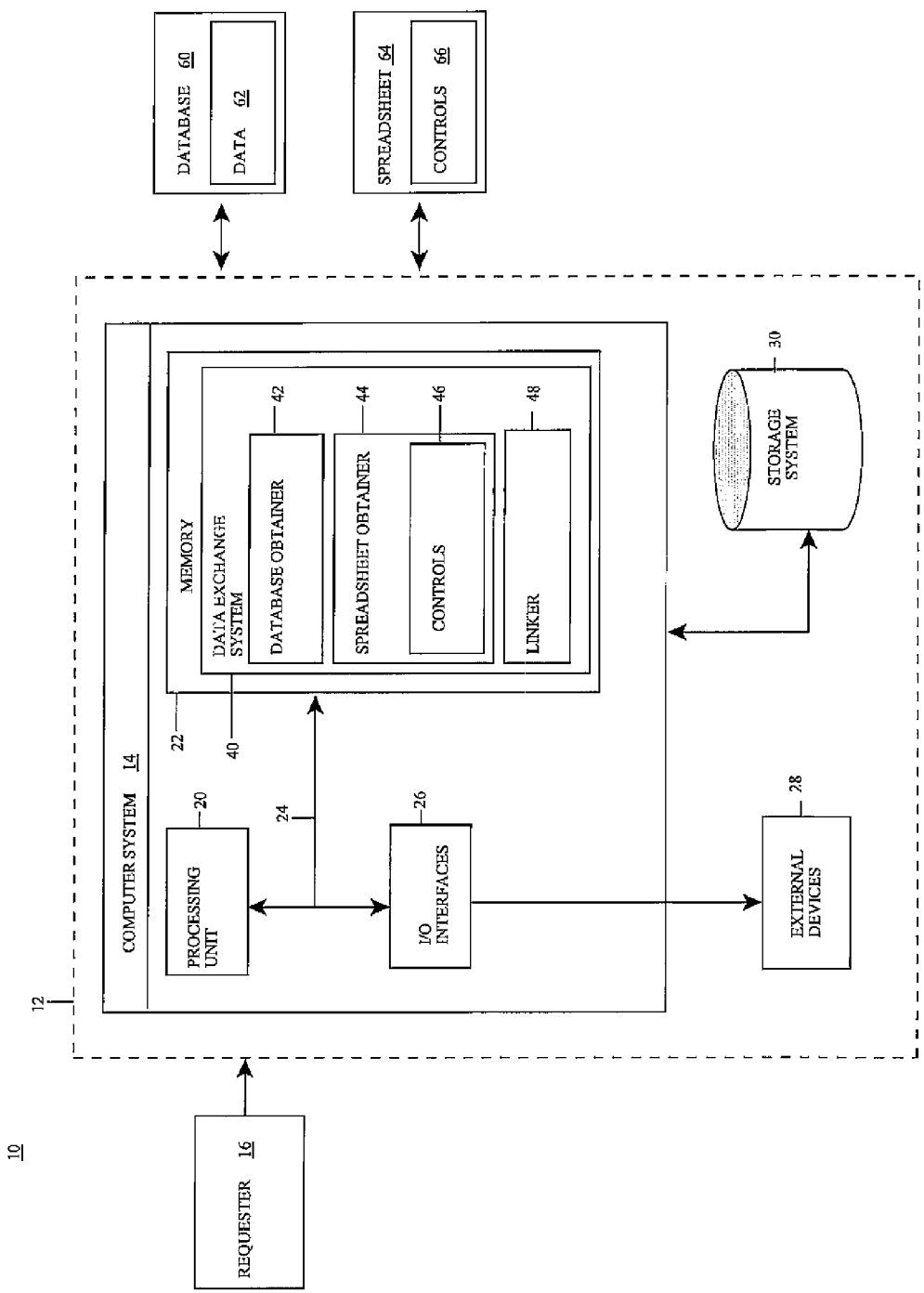
FIG. 1 shows an illustrative computer system for exchanging data between a database and an independent spreadsheet according to one embodiment of the present invention.

Referring now to FIG. 1, a system 10 for exchanging data between a database and a spreadsheet that is independent from the database browser according to the present invention is shown. Specifically, FIG. 1 depicts a system 10 in which data 62 may be exported from a database 60 to a spreadsheet 64 that is independent from database 60 and/or imported to database 60 from spreadsheet 64. This transfer of data 62 is accomplished using one or more controls 66 in the cells of spreadsheet 64. This transfer of data 62 may serve to allow a user to automatically retrieve data 62 from database 60, perform changes to data 62 on spreadsheet 64, and return the changed data 62 to database 60.

As depicted, system 10 includes a computer system 14 deployed within a computer infrastructure 12. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by a conventional TCP/IP sockets-based protocol, and an Internet service provider could be used to establish connectivity to the Internet. Still yet, computer infrastructure 12 is intended to demonstrate that some or all of the components of system 10 could be deployed, managed, serviced, etc. by a service provider who offers to exchange data between a database and a spreadsheet that is independent from the database.

As shown, computer system 14 includes a processing unit 20, a memory 22, a bus 24, and input/output (I/O) interfaces 26. Further, computer system 14 is shown in communication with external I/O devices/resources 28 and storage system 30. In general, processing unit 20 executes computer program code, such as a data update system 40, which is stored in memory 22 and/or storage system 30. While executing computer program code, processing unit 20 can read and/or write data to/from memory 22, storage system 30, and/or I/O interfaces 26. Bus 24 provides a communication link between each of the components in computer system 14. External devices 28 can comprise any devices (e.g., keyboard, pointing device, display, etc.) that enable a user to interact with computer system 14 and/or any devices (e.g., network card, modem, etc.) that enable computer system 14 to communicate with one or more other computing devices.

Computer infrastructure 12 is only illustrative of various types of computer infrastructures for implementing the invention. For example, in one embodiment, computer infrastructure 12 comprises two or more computing devices (e.g., a server cluster) that communicate over a network to perform the various process steps of the invention. Moreover, computer system 14 is only representative of various possible computer systems that can include numerous combinations of hardware and/or software. To this extent, in other embodiments, computer system 14 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 20 may comprise a single processing unit, or be distributed across one or more processing units in one or more locations, e.g., on a client and server. Similarly, memory 22 and/or storage system 30 can comprise any combination of various types of data storage and/or transmission media that reside at one or more physical locations. Further, I/O interfaces 26 can comprise any system for exchanging information with one or more external devices 28. Still further, it is understood that one or more additional components (e.g., system software, math co-processing unit, etc.) not shown in FIG. 1 can be included in computer system 14. However, if computer system 14 comprises a handheld device or the like, it is understood that one or more external devices 28 (e.g., a display) and/or storage system(s) 30 could be contained within computer system 14, not externally as shown.

Storage system 30 can be any type of system (e.g., a database) capable of providing storage for information under the present invention. For example, storage system 30 may be used to store one or more of database 60 and spreadsheet 64. To this extent, storage system 30 could include one or more storage devices, such as a magnetic disk drive or an optical disk drive. In another embodiment, storage system 30 includes data distributed across, for example, a local area network (LAN), wide area network (WAN) or a storage area network (SAN) (not shown). Although not shown, additional components, such as cache memory, communication systems, system software, etc., may be incorporated into computer system 14.

Shown in memory 22 of computer system 14 is a data exchange system 40, which is a software program that provides the functions of the present invention. Data exchange system 40 provides a system for exchanging data between database 60 and spreadsheet 64 that is independent from database 60. To this extent, data source configuration system 40 includes a database obtainer 42, a spreadsheet obtainer 44, and a linker 48.

Database obtainer 42 obtains database 60. Database 60 contains data 62 that is to be exported from and/or imported to spreadsheet 64. To this extent, database obtainer 42 may obtain database 60 from any source now known or later developed for obtaining a database, including, but not limited to from memory, from a file stored in storage system 30, from one or more external systems via a network, etc. In addition, database 60 may comprise any type of database in any format now known or later developed, including, but not limited to MICROSOFT ACCESS® (ACCESS is a trademark of Microsoft Corporation of Redmond, Wash. in the United States, other countries, or both), LOTUS NOTES® (NOTES is a trademarks of International Business Machines Corp. of Armonk, N.Y. in the United States and/or other countries), DB2 (DB2 is a trademark of International Business Machines Corp. of Armonk, N.Y. in the United States and/or other countries), etc.

Spreadsheet obtainer 44 obtains a spreadsheet 64 to which data 62 from database 60 is exported from and/or imported to. Spreadsheet 64 is not merely a construct of the application that is associated with database 60, but rather is an independent spreadsheet 64 in a stand-alone format. Spreadsheet 64 has a plurality of cells 68 (FIG. 2) for storing data 62 that is exported and/or imported. Spreadsheet 64 may be obtained in any manner that is now known or later developed, including, but not limited to, from memory, from a file stored in storage system 30, from one or more external systems via a network, etc. In addition, spreadsheet, 64 may comprise any type of spreadsheet in any format now known or later developed, including, but not limited to Microsoft Excel® (EXCEL is a trademark of Microsoft Corporation of Redmond, Wash. in the United States, other countries, or both), Lotus 123® (LOTUS and 123 are trademarks of International Business Machines Corp. of Armonk, N.Y. in the United States and/or other countries), OpenOffice.org Calc® (OPENOFFICE.ORG is a trademark of Team OpenOffice.org e.V. of Hamburg, Germany in the United States and/or other countries), etc.

Figure 2:
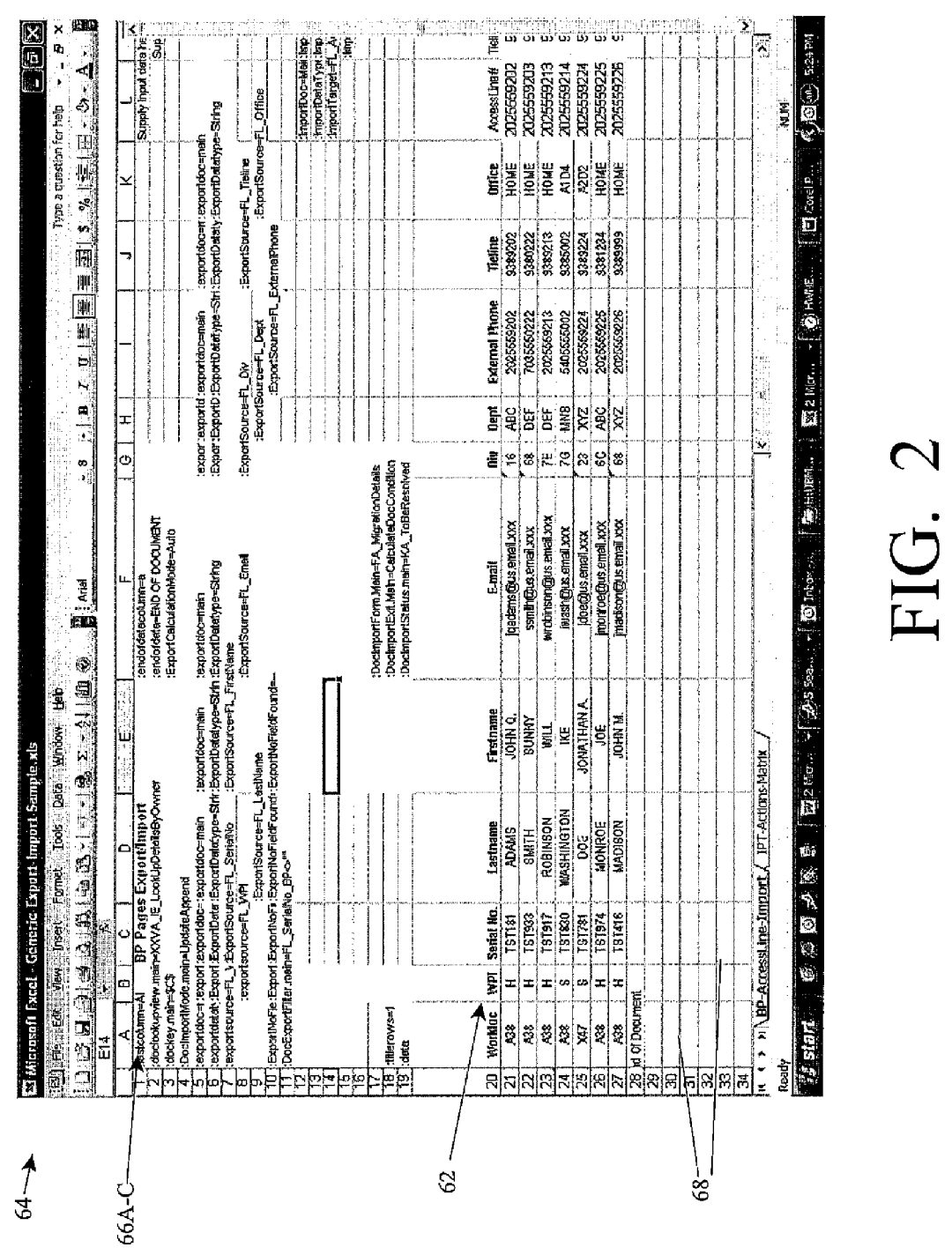

Referring now to FIGS. 1 and 2 concurrently, included in at least one of cells 68 of spreadsheet 64 is a control 66A-C that controls a manner of an exchange of data 62 between database 60 and spreadsheet 64. In an alternative embodiment, controls 66A-C, rather than being including in cells 68 of spreadsheet 64, itself, may be in a separate location. In the case that data 62 is to be imported from spreadsheet 64 to database 60, controls 66A-C may specify such things as what data 62 from spreadsheet 64 is to be imported, the format of data 62 to be imported, where data 62 is to be placed in database 60, what to do if data 62 describes an element that is new to database 60, etc. In the case that data 62 is to be exported from database 60 to spreadsheet 64, controls 66A-C may specify what data 62 to extract from database 60, where data 62 is to be placed in spreadsheet 64, what format data 62 is in, what filters should be used on data 62, what formulas should be created for placing in cells 68 of spreadsheet 64, what value to place in cell 68 of spreadsheet 64 if no data 62 exists in database 60, etc. In general, controls 66A-C are processed beginning in cell 68 A1 and continue in a particular column of spreadsheet 64 until an end column control, such as ":Data" is reached. Processing of controls 66A-C then progresses to the next column until and end of controls control, such as "LastColumn" is reached. Controls 66A-C may include substitution values that support dynamic completion of control 66A-C, such as the following:

$col$
The column number substitution is replaced with the current column identifier of the cell being written to.
$row$
The row number substitution is replaced with the current row number of the cell being written to.
$A$
A column substitution variable such as $A$ may be used, this variable will be replaced by the value in the current row under the column indicated by the variable name.
$1$
A row substitution variable such as $12$ may be used, this variable will be replaced with the data in the row indicated by the variable under the current column.

In performing their tasks, control 66A-C may take the form of a sheet control 66A, a column control 66B or a data control 66C. Generally, sheet control 66A specifies control options for an entire sheet (also called a tab) in spreadsheet 64. Sheet controls 66A are generally located in the first column or columns of a particular sheet. One special type of sheet control 66A, called a book control may be used to set defaults for all sheets (tabs) in spreadsheet 64. The following are examples of possible book/sheet controls:

Book Controls
These controls are used at a work book level, they only need to be included in one of the sheets along with other controls.
:ImportRoles=r1:r2 . . .
Defines a list of roles that are authorized to do the import. The user importing this file must be a member of one of these roles in order for the import to be processed.
:ExportRoles=r1:r2 . . .
Defines a list of roles that are authorized to create the exported Excel file from the template.
:ExportCalculationMode=mode
Determines the calculation mode saved with the Excel file. Mode can be Auto or Manual, the default is Auto.
Sheet Controls
These controls should be first on the sheet and effect all data columns on the sheet.
:LastColumn=n
Defines the number of columns to be considered for import/export, data and controls. This control should be in cell A1 of any sheet that is to do import or export, if not then that sheet is skipped.
:TitleRows=n
Defines the number of rows immediately following the :Data label that are used as a heading for the data. The default is 1.
:IgnoreRowColumn=n
Defines a column that is used to indicate when a row should be ignored. A row will be ignored or skipped when the :IgnoreRow value is in the column.
:IgnoreRow=value
Defines the value that indicates that the row should be ignored. This value indicates that this row is to be ignored when it is in the :IgnoreRowColumn.
:EndOfDataColumn=n
Defines what column has the end of data indication in it. This defaults to A.
:EndOfData=value
Defines the end of data indicator. This defaults to blank.
The following define documents that will be receiving import data or will be used to supply export data, within the parameters the .ID is an identifier that is used to tie this to a column, see Doc=.
:DocLookupView.ID=view
Define a look up view that is used to find an existing document. For import this is used to find an existing document that is to be updated. For export the first defined view is the list of documents to be exported and additional views are used to find secondary documents that are related to the ones in the first view that will have data placed on the same row in the export.
:DocKey.ID=n;n . . .
For import this identifies the key to be used with the lookupView to find an existing document. For export on all but the first view defined this is a key used to find the additional related documents on a given row.

Variable substitutions can be used in the keys as described in the Substitutions section above.
Example: DocKey.activity=$A$~Common-WAN-Transformation
This would find and activity document that has a fixed common identifier and a site ID listed in column A, as long as DocLookupView.activity was set up to list activities by the site ID~common ID key
:DocKeyExit.ID=key
Specify the key that is used by the project level key exit. The document key exit is used to find a document for imports or exports. The specified key value can be used by the exit to determine what action to take. Specifying no key will disable this exit and use the default look-up to find the document.
:DocExportFilter.ID=filter
Used for the first defined :DocLookupView for export only. This is a formula that is used as a filter allowing only a subset of the documents in the view to be included in the export. This defaults to blank, meaning all documents in the view are exported.
:DocImportForm.ID=form
Defines the name of the form for newly created documents that go into this view. This must be specified for imports that will create a new document.
:DocImportStatus.ID=keystatus
Defines the status of a newly created document that goes into this view. This status will be overridden if the status is one of the columns being imported.
:DocImportMode.ID=mode
This control describes import behavior as follows:
UpdateAppend
If an existing document is found, it is updated with the imported data. If no document is found the imported data is added as a new document, this is the default.
UpdateOnly
If an existing document is found, it is updated with the imported data. If no document is found the imported data is ignored.
ReplaceAppend
If an existing document is found, it is replaced with the imported data. If no document is found the imported data is added as a new document.
ReplaceOnly
If an existing document is found, it is replaced with the imported data. If no document is found the imported data is ignored.
AppendAll
The imported data is always added as a new document. Existing documents are not changed so this could lead to duplicate keyed documents.
ReplaceAll
The imported data is always added as a new document. All existing documents are removed, the import replaces any that were there.
:DocImportExit.ID=key
Specify the key that is used by the project level import doc exit that is executed after all data has been placed in the document but before the document is saved. This key is used by the exit to determine what action to take. Specifying no key will disable this exit.
:DocImportNewExit.ID=key
Specify the key that is used by the project level import new doc exit that is executed after creating a new document in the database. This key is used by the exit to determine what action to take. Specifying no key will disable this exit.
:Data
Indicates that the data starts on the next row. This control should be in column A of the sheet. All rows following the row that has this control on it up to the row directly above the end of data marker will be process as data. Within the data the title lines and ignored rows can be used to skip comments or headings.
:ExportStart=n
Specify what document in the first defined view to start the export with, this defaults to the first document. This is useful for debugging the template.
:ExportCount=n
Specify how many documents from the first defined view are to be exported. This is useful for debugging the template.
:ExportCalculationCycles=n
Calculations are turned off while exporting into the sheet. This control specifies how many calculation cycles are required after the sheet is completely exported. This defaults to 1.
:ImportCalculationCycles=n
This control specifies how many calculation cycles are preformed on each sheet before starting to import it. This defaults to 0.
:PreImportExit=key
Specify the key that is used by the project level preimport exit that is executed before any import takes place. This key is used by the exit to determine what action to take. Specifying no key will disable this exit.
:PostImportExit=key
Specify the key that is used by the project level post import exit that is executed after the import is complete. This key is used by the exit to determine what action to take. Specifying no key will disable this exit.
:PreExportExit=key
Specify the key that is used by the preexport exit that is executed before any export is done. This key is used by the exit to determine what action to take. Specifying no key will disable this exit.
:PostExportExit=key
Specify the key that is used by the post export exit that is executed after all of the export has been done. This key is used by the exit to determine what action to take. Specifying no key will disable this exit.

Column controls 66B specify parameters for data 62 within a particular column of spreadsheet 64. Some examples of column controls 66B are as follows:
Column Controls
This section controls what is to be done with each column during imports or how to export data to each column.
:Column=n
This defines the column that is being defined for all other parameters that follow within the same column. This can be used to place column parameters all in the first column. The default for this is the current column.
:ImportDoc=ID
Defines which of documents defined with the :DocLookupView control will have the data from this column placed in it. The default is blank indicating that this column is not imported.
:ImportDataType=type
:ImportTarget=target
:ImportNLSTarget=NLStarget
:ImportNumberFormat=format
:ImportDateFormat=format
:ImportListName=name
These are related, ImportDataType defines how the data is to be stored in Lotus Notes (hereafter, Notes) and ImportTarget defines the target according to this type. The ImportNLSTarget is only used if a field definition name is used as the type. The following describe the types and the targets needed for each.

ReZoneDate
The data is treated as a date. On import the time is converted to the time zone of the server from the web or the user from Notes. The source is the field name in the document where the data came from.

Date
The data is treated as a date. On import the time is not converted and is considered to be in the zone defined in the configuration. The target is the field name in the document where the data will be placed.

String
The data is converted to a string, this is the default. If the data is a date in the import, the ImportDateFormat is used to convert it to a string. If the data is a number in the import, the ImportNumberFormat is used to convert it to a string. The target is the field name in the document where the data will be placed.

Number
During import the value is converted to a number. The target is the field name in the document where the data will be placed.

KeyStatus
Identifies this column as a key word status requiring a status change process to be used. The target is ignored. If the value is not a legal key status then the status is not changed.

NLSStatus
Identifies this column as an NLS status requiring a status change process to be used. The target is ignored. If the value is not a legal NLS status then the status is not changed.

KeyLookUp
Identifies this column as a key word value. The given value will be placed in the field named with ImportTarget. The NLS value is found by using the list named with ImportListName and this NLS value is placed in the field named with ImportNLSTarget. If either of the filed names are blank then the value that is to be saved there is not stored.

NLSLookUp
Identifies this column as an NLS value. The given value will be placed in the field named with ImportNLSTarget. The key value is found by using the list named with ImportListName and this key value is placed in the field named with ImportTarget. If either of the filed names are blank then the value that is to be saved there is not stored.

:ImportIgnore=value
Specify a value that is ignored during import. Enter this value in the format that it would be entered into the sheet.

:ImportNoDataFound=value
Specify the value to be placed in Notes when the cell is empty. Enter this value in the format that it would be entered into the sheet, When the data type is KeyStatus or NLSStatus and this is null or not set then the current status is not changed.

:ImportDataExit=key
Specify the key that is used by the project level import data exit that is executed after the data is read from the import sheet but before the data is placed in the document. This key is used by the exit to determine what action to take. Specifying no key will disable this exit.

:ExportDoc=ID
Defines which of documents defined with the :DocLookupView control will be used as the source for the exported data in this column. The default is blank indicating that this column is not exported.

:ExportDataType=type
:ExportSource=source
:ExportNumberFormat=format
:ExportDateFormat=format These are related, ExportDataType defines the type of data to place in the export and ExportSource defines the source according to this type. The following describe the types and sources needed for each.

ReZoneDate
Date data in Notes is passed as a date to Excel. If the Notes data is not a date then the text representation of the data is passed to Excel as a string. Before being exported the date and time are converted to the servers time zone when done from the web and user time zone when done on a users workstation. The field name in the Notes document to be exported is given with the :ExportSource control.

Date
Date data in Notes is passed as a date to Excel. If the Notes data is not a date then the text representation of the data is passed to Excel as a string. No time zone conversion is done to the date and time before it is exported. The field name in the Notes document to be exported is given with the :ExportSource control.

String
The data is always converted to a string, this is the default. The field name in the Notes document to be exported is given with the :ExportSource control. The format of the exported string depends on how the data is stored in Notes and the associated format given with the :ExportNumberFormat or :ExportDateFormat controls. The format of the exported data is controlled by using the :ExportNumberFormat or :ExportDateFormat controls to define formatting templates. The characters used in these templates is listed in the tables below.

Number
If the data is stored as a number, it is placed in the cell as a number, otherwise the text representation of the value is placed there. The field name in the Notes document to be exported is given with the :ExportSource control.

Formula
Identifies the column as formula. The formula to be exported is given with the :ExportSource control Variable substitutions as described under Substitutions may be used in any formula.

ViewColumn
One of the columns in the view defined with the :DocLookupView control will be exported into this column. The column number to export is given with the :ExportSource control.

Date Named Formats
Format name Display of the date/time value is . . .
General Date In a standard format. Converts a floating-point number to a date/time. If the number includes no fractional part, this displays only a date. If the number includes no integer part, this displays only a time.
Long Date A Long Date as defined in the operating system's international settings.
Medium Date dd-mmm-yy (yy/mmm/dd in Japan)
Short Date A Short Date as defined in the operating system's international settings.
Long Time A Long Time as defined in the operating system's international settings.
Long Time always includes hours, minutes, and seconds.
Medium Time Hours (0-12) and minutes using the time separator and AM/PM notation (AMPM notation in Japan)
Short Time Hours (0-23) and minutes using only the time separator.

Date Custom Format Characters

:(colon) Time separator. Separates hours, minutes, and seconds in formatted time values. The actual time separator used in the returned formatted value is the time separator specified for the given country in the operating system's international settings.

/(slash) Date separator. Separates day, month, and year in formatted date values. The actual date separator used in the returned formatted value is the date separator specified in the operating system's international settings.

c Displays a date as ddddd, and a time as ttttt (see below). If the value includes no fractional part, only a date is displayed. If the value includes no integer part, only a time is displayed.

y Day of the year as a number (1-366).

d Day of the month as a number without a leading zero (1-31).

dd Day of the month as a number with a leading zero (01-31).

ddd Weekday as a three-letter abbreviation (Sun-Sat).

dddd Weekday spelled out (Sunday-Saturday).

ddddd Serial date number as a complete date (day, month, and year) formatted as an international Short Date string. If there is no Short Date string provided in the operating system, the date format defaults to mm/dd/yy.

dddddd Serial date number as a complete date (day, month, and year) formatted as an international Long Date string. If there is no Long Date string provided in the operating system, the date format defaults to mmmm dd, yyyy.

w Weekday as a number (1-7). Sunday is 1.

ww Week of the year as a number (1-53).

m Month of the year as a number without a leading zero (1-12). If the character is preceded by h in fmt, it displays the minute of the hour as a number without a leading zero (0-59).

mm Month of the year as a number with a leading zero (01-12). If the character is preceded by h in fmt, it displays the minute of the hour as a number with a leading zero (00-59).

mmm Month name as a 3-letter abbreviation (January-December).

mmmm Month name spelled out (January-December).

q Quarter of the year as a number (1-4).

yy The last two digits of the year (00-99). If you specify yy in Notes or Domino, LotusScript interprets 50 through 99 as the years 1950 through 1999 and 00 through 49 as the years 2000 through 2049. Note that SmartSuite interprets yy differently.

yyyy The full (four-digit) year (0100-9999).

h Hour of the day as a number without a leading zero (0-23).

hh Hour of the day as a number with a leading zero (00-23).

n Minute of the hour as a number without a leading zero (0-59).

nn Minute of the hour as a number with a leading zero (00-59).

s Second of the minute as a number without a leading zero (0-59).

ss Second of the minute as a number with a leading zero (00-59).

ttttt Time serial number as a complete time (including hour, minute, and second), formatted using the time separator provided in the operating system's international settings. A leading zero is displayed if the international leading zero setting is TRUE and the time is before 10:00 AM or PM. The default time format is h:mm:ss.

AM/PM am/pm Uses hour values from 1 to 12, displaying AM or am for hours before noon, and PM or pm for hours after noon.

A/P a/p Uses hour values from 1 to 12, displaying A or a for hours before noon, and P or p for hours after noon.

AMPM Uses hour values from 1 to 12. Displays the contents of the 1159 string (s1159) in WIN.INI for hours before noon, and the contents of the 2359 string (s2359) for hours after noon. AMPM is case-insensitive, but the case of the string displayed matches the string as it exists in the operating system's international settings. The default format is AM/PM.

zzz Include the time zone at the end. This must be the last 3 characters of the format string.

Number Named Formats

General Number As stored, without thousands separators.

Currency As defined in the operating system's international settings. For example, you can format currency values with thousands separators, negative values in parentheses, and two digits to the right of the decimal separator.

In OS/2, the function does not append the currency symbol to the number.

Fixed With at least one digit to the left of the decimal separator, and with two digits to the right of the decimal separator.

Standard With thousands separators, with at least one digit to the left of the decimal separator, and with two digits to the right of the decimal separator.

Percentexpr multiplied by 100, with at least one digit to the left of the decimal separator. Two digits are displayed to the right of the decimal separator, and a percent sign (%) follows the number.

Scientific In standard scientific notation: with one digit to the left of the decimal separator and two digits to the right of the decimal separator, followed by the letter E or e and a number representing the exponent.

Yes/No No if the number is 0, and Yes otherwise.

True/False False if the number is 0, and True otherwise.

On/Off Off if the number is 0, and On otherwise.

Number Custom Format Characters

" " (Empty string) Display the number with no formatting 0 (zero) Digit forced display. A digit is displayed for each zero in fmt, with leading or trailing zeros to fill unused spaces. All digits to the left of the decimal separator are displayed. If the number includes more decimal places than fmt, it is rounded appropriately.

(pound sign) Digit conditional display. The same display as 0 (digit forced display), except that no leading or trailing zeros are displayed.

.(period) Decimal separator. The position of the decimal separator in fmt. Unless your formatting code includes a 0 immediately to the left of the decimal separator, numbers between −1 and 1 begin with the decimal separator, The actual decimal separator used in the returned formatted value is the decimal separator specified in the operating system's international settings.

% (percent sign) Percentage placeholder. Multiplies the number by 100 and inserts the percent sign (%) in the position where it appears in fmt. If you include more than one percentage placeholder, the number is multiplied by 100 for each %. For example, %% means multiplication by 10000.

,(comma) Thousands separator. To separate groups of three digits, counting left from the decimal separator, within numbers that include at least four digits to the left of the decimal separator, enclose the comma between a pair of the digit symbols 0 or #. The actual thousands separator used in the returned formatted value is the thousands separator specified in the operating system's international settings.

A special case is when the comma is placed immediately to the left of the decimal separator (or the position of the implied decimal separator). This causes the number to be divided by 1000. For example, this returns "100":

x=Format$(100000,"##0,.")

If 100000 is replaced in this example by a number less than 1000 in absolute value, then this function returns "0."

E–E+e–e+ Scientific notation. The number of digit symbols (0 or #) to the left of the decimal separator specifies how many digits are displayed to the left of the decimal separator, and the resulting magnitude of the exponent.

Use E+ or e+ to display the sign of all exponents (the symbol + or –). Use E– or e– to display the sign of negative exponents only (the symbol –).

All exponent digits are displayed, regardless of how many digit symbols follow the E–, E+, e–, or e+. If there are no digit symbols (the symbol 0 or #), an exponent of zero is not displayed; otherwise at least one exponent digit is displayed. Use 0 to format a minimum number of exponent digits, up to a maximum of three.

$ (dollar sign) Currency symbol. Designates a currency value. The actual currency symbol used in the returned formatted value is the currency symbol specified in the operating system's international settings.

–+( ) space Literal characters. These are displayed as they appear in the format string.

\(backslash) Literal character prefix. The character following the backslash is displayed as is; for example, \# displays #. To display a backslash itself, precede it with another backslash; that is, \\ displays \.

"ABC" Literal string enclosed in double quotation marks. To specify the double quotation mark character in the fmt argument, you must use Chr(34).

The characters enclosed in quotation marks are displayed as they appear in the format string.

;(semicolon) Format section separator. Separates the positive, negative, zero, and NULL sections in fmt. If you omit the negative or zero format sections, but include the semicolons representing them, they are formatted like the positive section.

:ExportNoDocFound=value
Defines the value that is placed in a column if no document id found in the :DocLookupView with the key defined by :DocKey. This defaults to blank meaning that no data is placed in the column.

:ExportNoFieldFound=value
Defines the value that is placed in a column if no the field specified in the :ExportSource does not exist in the document. This defaults to blank meaning that no data is placed in the column.

Data controls 66C specify parameters for data 62 within a particular cell 68 of spreadsheet 64. Some examples of data controls 66C may be taken from the above list of column controls and modified to refer to a single (or multiple) data cell 68.

Linker 48 facilitates the exchange of data 62 between database 60 and spreadsheet 64. Specifically, linker 48 facilitates the import of data 62 to spreadsheet 64 and/or the export of data from spreadsheet 64 utilizing controls 66. This linking performed by linker 48 allows a user who has no knowledge of database 60 and/or the inner workings thereof to access, view, and/or modify the data therein simply by accessing spreadsheet 64 with controls 66. When spreadsheet 64 is accessed, linker 48 will automatically access the data in database 60 for import and/or export in accordance with controls 66. In the case that controls 66A-C are in a separate location than in cells 68 of spreadsheet 64, linker may retrieve controls 66A-C from this location to facilitate the exchange of data 62. Since spreadsheet 64 is independent from database 60, linker provides the link to enable communication between the two. To this end, linker 48 may be written in a macro language associated with database 60. In the alternative, linker 48 may be written in an external language such as Java, Visual Basic, or the like.

Figure 3:
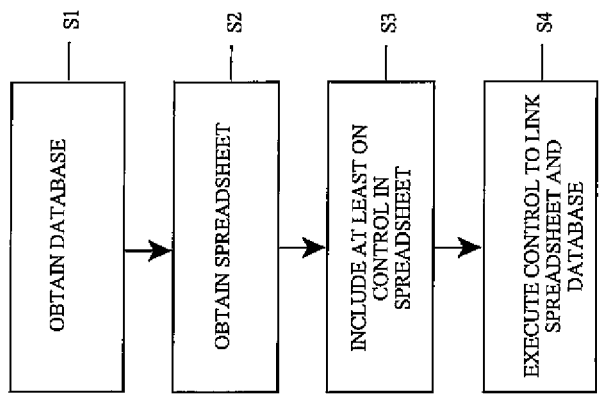
FIG. 3 shows an illustrative method flow diagram according to the present invention.

Turning now to FIG. 3, a flow chart of a method according to an embodiment of the present invention is depicted, which is described with reference to FIG. 1. In process S1, database obtainer 42 obtains database 60 having data 62. In process S2, spreadsheet obtainer 44 obtains spreadsheet 64 having cells 68 for storing data 62. In process S3, control 66, which controls the manner in which data 62 is exchanged between database 60 and spreadsheet 64, is included in at least one of cells 68 of spreadsheet 64. In process S3. Control 66 is executing using linker 48 that facilitates the exchange of data 62 between database 60 and spreadsheet 64.

While shown and described herein as a method and system for exchanging data between a database and a spreadsheet that is independent from the database browser, it is understood that the invention further provides various alternative embodiments. For example, in one embodiment, the invention provides a computer-readable/useable medium that includes computer program code to enable a computer infrastructure to exchange data between a database and a spreadsheet that is independent from the database browser. To this extent, the computer-readable/useable medium includes program code that implements each of the various process steps of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 22 (FIG. 1) and/or storage system 30 (FIG. 1) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a method that performs the process steps of the invention on a subscription, advertising, and/or fee basis. That is, a service provider, such as a Solution Integrator, could offer a service that exchanges data between a database and a spreadsheet that is independent from the database browser. In this case, the service provider can create, maintain, support, etc., a computer infrastructure, such as computer infrastructure 12 (FIG. 1) that performs the process steps of the invention for one or more entities. In return, the service provider can receive payment from the entity(s) under a subscription and/or fee agreement and/or the service provider can receive payment from the sale of advertising content to one or more third parties.

In still another embodiment, the invention provides a computer-implemented method for exchanging data between a database and a spreadsheet that is independent from the database browser. In this case, a computer infrastructure, such as computer infrastructure 12 (FIG. 1), can be provided and one or more systems for performing the process steps of the invention can be obtained (e.g., created, purchased, used, modified, etc.) and deployed to the computer infrastructure. To this extent, the deployment of a system can comprise one or more of (1) installing program code on a computing device, such as computer system 14 (FIG. 1), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method for exchanging data between a database and a spreadsheet that is independent from the database, comprising:
    obtaining a database, the database having data;
    obtaining a spreadsheet, the spreadsheet having a plurality of cells for storing data;
    including, in at least one of the cells of the spreadsheet, a control that controls a manner of an exchange of the data between the database and the spreadsheet, the control being one of a set of database platform independent controls that define aspects of the exchange of data between the database and the spreadsheet relating to identity, format and location of the data to be exchanged, all of the set of controls being in the cells of the spreadsheet, wherein the platform independent controls are in a format that is independent of a format of the database; and
    executing, upon accessing of the spreadsheet, the set of controls by a linker that facilitates the exchange of the data between the database and the spreadsheet, the linker being independent of the database.

2. The method of claim 1, wherein the exchange of the data is an import of the data from the database to the spreadsheet.

3. The method of claim 1, wherein the exchange of the data is an export of the data from the spreadsheet to the database.

4. The method of claim 1, the control being selected from the group consisting of a sheet control, a column control and a data control.

5. The method of claim 1, wherein the control specifies at least one of a data type, a formatting parameter, a source field, a destination field, and a formula for a designated cell in the spreadsheet.

6. The method of claim 1, wherein spreadsheet is in a Microsoft Excel format and the database is in a Lotus Notes format.

7. A system for exchanging data between a database and a spreadsheet that is independent from the database, comprising:
    a computer device, including:
    a database having data;
    a spreadsheet having a plurality of cells for storing data, at least one of the cells the spreadsheet having a control that controls a manner of an exchange of the data between the database and the spreadsheet, the control being one of a set of database platform independent controls that define aspects of the exchange of data between the database and the spreadsheet relating to identity, format and location of the data to be exchanged, all of the set of controls being in the cells of the spreadsheet, wherein the platform independent controls are in a format that is independent of a format of the database; and
    a linker independent of the database, that executes, upon accessing of the spreadsheet, the set of controls to facilitate the exchange of the data between the database and the spreadsheet.

8. The system of claim 7, wherein the exchange of the data is an import of the data from the database to the spreadsheet.

9. The system of claim 7, wherein the exchange of the data is an export of the data from the spreadsheet to the database.

10. The system of claim 7, the control being selected from the group consisting of a sheet control, a column control and a data control.

11. The system of claim 7, wherein the control specifies at least one of a data type, a formatting parameter, a source field, a destination field, and a formula for a designated cell in the spreadsheet.

12. The system of claim 7, wherein spreadsheet is in a Microsoft Excel format and the database is in a Lotus Notes format.

13. A program product stored on a computer readable storage medium for exchanging data between a database and a spreadsheet that is independent from the database browser, the computer readable medium comprising:
    program code for a database, the database having data;
    program code for obtaining a spreadsheet, the spreadsheet having a plurality of cells for storing data;
    program code for including, in at least one of the cells the spreadsheet, a control that controls a manner of an exchange of the data between the database and the spreadsheet, the control being one of a set of database platform independent controls that define all aspects of the exchange of data between the database and the spreadsheet relating to identity, format and location of the data to be exchanged, all of the set of controls being in the cells of the spreadsheet, wherein the platform independent controls are in a format that is independent of a format of the database; and
    program code for executing, upon accessing of the spreadsheet, the set of controls by a linker that facilitates the exchange of the data between the database and the spreadsheet, the linker being independent of the database.

14. The program product of claim 13, wherein the exchange of the data is an import of the data from the database to the spreadsheet.

15. The program product of claim 13, wherein the exchange of the data is an export of the data from the spreadsheet to the database.

16. The program product of claim 13, the control being selected from the group consisting of a sheet control, a column control and a data control.

17. The program product of claim 13, wherein the control specifies at least one of a data type, a formatting parameter, a source field, a destination field, and a formula for a designated cell in the spreadsheet.

18. The program product of claim 13, wherein spreadsheet is in a Microsoft Excel format and the database is in a Lotus Notes format.

19. A method for deploying an application for updating browser page elements delivered over a distributed network, comprising:

obtaining a database, the database having data;

obtaining a spreadsheet, the spreadsheet having a plurality of cells for storing data;

including, in at least one of the cells the spreadsheet, a control that controls a manner of an exchange of the data between the database and the spreadsheet, the control being one of a set of database platform independent controls that define all aspects of the exchange of data between the database and the spreadsheet relating to identity, format and location of the data to be exchanged, all of the set of controls being in the cells of the spreadsheet, wherein the platform independent controls are in a format that is independent of a format of the database; and executing, upon accessing of the spreadsheet, the set of controls by a linker that facilitates the exchange of the data between the database and the spreadsheet, the linker being independent of the database.

20. The method of claim 19, wherein the control specifies at least one of a data type, a formatting parameter, a source field, a destination field, and a formula for a designated cell in the spreadsheet.

* * * * *